Figure 1:
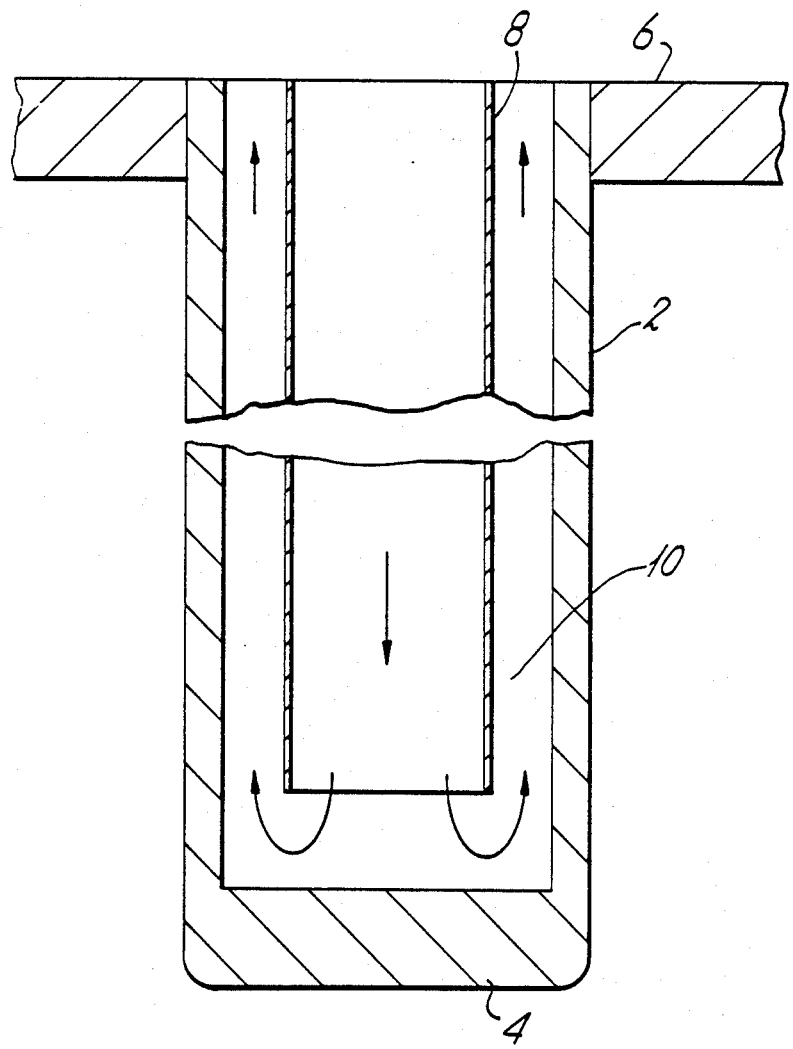

United States Patent [19]

Houghton et al.

[11] Patent Number: 4,831,968
[45] Date of Patent: May 23, 1989

[54] REBOILER

[75] Inventors: Fred Houghton; Paul Holmes, both of Cleveland, Great Britain

[73] Assignee: Foster Wheeler Energy Corporation, Clinton, N.J.

[21] Appl. No.: 96,917

[22] PCT Filed: Jan. 7, 1987

[86] PCT No.: PCT/GB87/00003
 § 371 Date: Oct. 6, 1987
 § 102(e) Date: Oct. 6, 1987

[87] PCT Pub. No.: WO87/04084
 PCT Pub. Date: Jul. 16, 1987

[30] Foreign Application Priority Data
Jan. 10, 1986 [GB] United Kingdom ............. 8600539

[51] Int. Cl.⁴ ............................................. F22B 37/22
[52] U.S. Cl. ..................................... 122/362; 122/32
[58] Field of Search .................. 122/362, 364, 32; 159/27.1, 27.2

[56] References Cited
U.S. PATENT DOCUMENTS

| | | | |
|---|---|---|---|
| 743,316 | 11/1903 | McKechnie | 122/362 |
| 825,649 | 7/1906 | Henry | 122/362 |
| 1,154,194 | 9/1915 | Meier | 122/362 |
| 1,450,838 | 4/1923 | Bussac | 122/362 |

Primary Examiner—Edward G. Favors
Attorney, Agent, or Firm—Marvin A. Naigur; Charles W. Fallow; Robert J. Seman

[57] ABSTRACT

A reboiler and method of generating vapor from a liquid comprising a rectifying section and an evaporating section in which the evaporating section comprises a plurality of upright evaporator tubes (2) connected at their upper ends to a tube sheet (6), means for supplying liquid to the evaporator tubes and means (22) for heating the surface of evaporator tubes (2), the lower ends (4) of the evaporator tubes being sealed and each evaporator tube being provided with a concentrically positioned inner tube (8) extending from the upper end of each evaporator tube (2) to a position above the sealed end (4) of each evaporator tube and in which the rectifying section comprises a series of trays containing liquid and means for directing vapor generated in the evaporating section through the trays.

5 Claims, 3 Drawing Sheets

REBOILER

This invention relates to a naturally circulating reboiler.

Conventional water tube boilers comprise a plurality of tubes connected between two drums or tube sheets such that each tube communicates between two headers. It is common practice to contain the pressurized boiling liquid inside unobstructed tubes and to heat these tubes by passing hot gases over the outer tubes surface. Natural circulation of the liquid is achieved by installing unheated tubes between the two headers to provide a return liquid passage.

The above described arrangement has major disadvantages when used with small boilers due to differential expansions between the boiler tubes and the casing which can lead to tube failure and leakages. Tubes and baffles are difficult to clean due to limited access and the relatively large space requirements used to accommodate liquid and liquid vapor headers.

In a naturally circulating reboiler, the first stage separation of one of the compounds from a mixture of two or more chemicals is accomplished by the application of heat. This heat provides latent heat of vaporization as well as the energy to break the chemical bonding between compounds. The resultant separated fluid, in vapor form, contains a higher concentration of the required chemical compound than the liquid from which the vapor has derived. A double rectifying column connected to the reboiler further purifies the liberated vapor. This column forms an integral part of the reboiler as it feeds liquid to the vaporizing section that is relatively more concentrated than the liquid circulating in the heated vessel. This reboiler differs from conventional units by being directly fired as most are heated indirectly by a heat exchanger. The form of construction described below has major advantages when used in small scale systems. Differential expansion between vaporizing tube and casings which can lead to high stresses, distortion and eventual leakage are avoided. Cleaning outer surface of tubes and baffles is also simplified as access is greatly improved.

The present invention provides an improved reboiler construction.

According to the present invention there is provided a reboiler comprising a rectifying section and an evaporating section in which the evaporating section comprises a plurality of upright evaporator tubes connected at their upper ends to a tube sheet, means for supplying a mixture of chemicals in liquid form to the evaporator tubes and means for heating the surface of evaporator tubes, the lower ends of the evaporator tubes being sealed and each evaporator tube being provided with a concentrically positioned inner tube extending from the upper end of each evaporator tube to a position above the sealed end of each evaporator tube, and in which the rectifying section comprises a series of trays containing liquid and means for directing vapor generated in the evaporating section through the trays.

The reboiler of the invention has an evaporator section of simple effective construction. In operation, mixture of chemicals in liquid is introduced into the header above the evaporator tubes formed by the tube sheet and each of the evaporator tubes are completely filled with liquid due to the level of liquid in the header. Heat is applied to the outer surface of the evaporator tubes which causes boiling of the liquid to occur in the annulus formed between the evaporator tube and its concentrically mounted inner tube. The vapor rises through the liquid contained in the annulus towards the liquid surface in the header creating a difference in bulk density between fluids in the inner tube and the annulus. This density difference creates a natural circulation of liquid which is drawn down the inner tube from the body of liquid contained in the header, around the gap between the inner tube and the sealed end of the evaporator tube, to pass into the annulus between the evaporator and inner tubes where boiling occurs.

The concept of the invention allows increased constructional flexibility compared with the arrangements of the prior art. It is readily possible to incorporate tubes of different lengths into an evaporating section thereby accommodating different shapes, eg. flame tubes. Furthermore, the evaporator tubes are not connected at their lower ends to a tube plate or the like and do not interact with the baffle plate arrangement and this can be used to advantage to increase heat transfer coefficients with a further advantage that the array of evaporator tubes can be completely removed from a baffle plate arrangement without need to cut tubes or dismantle headers.

Figure 2:
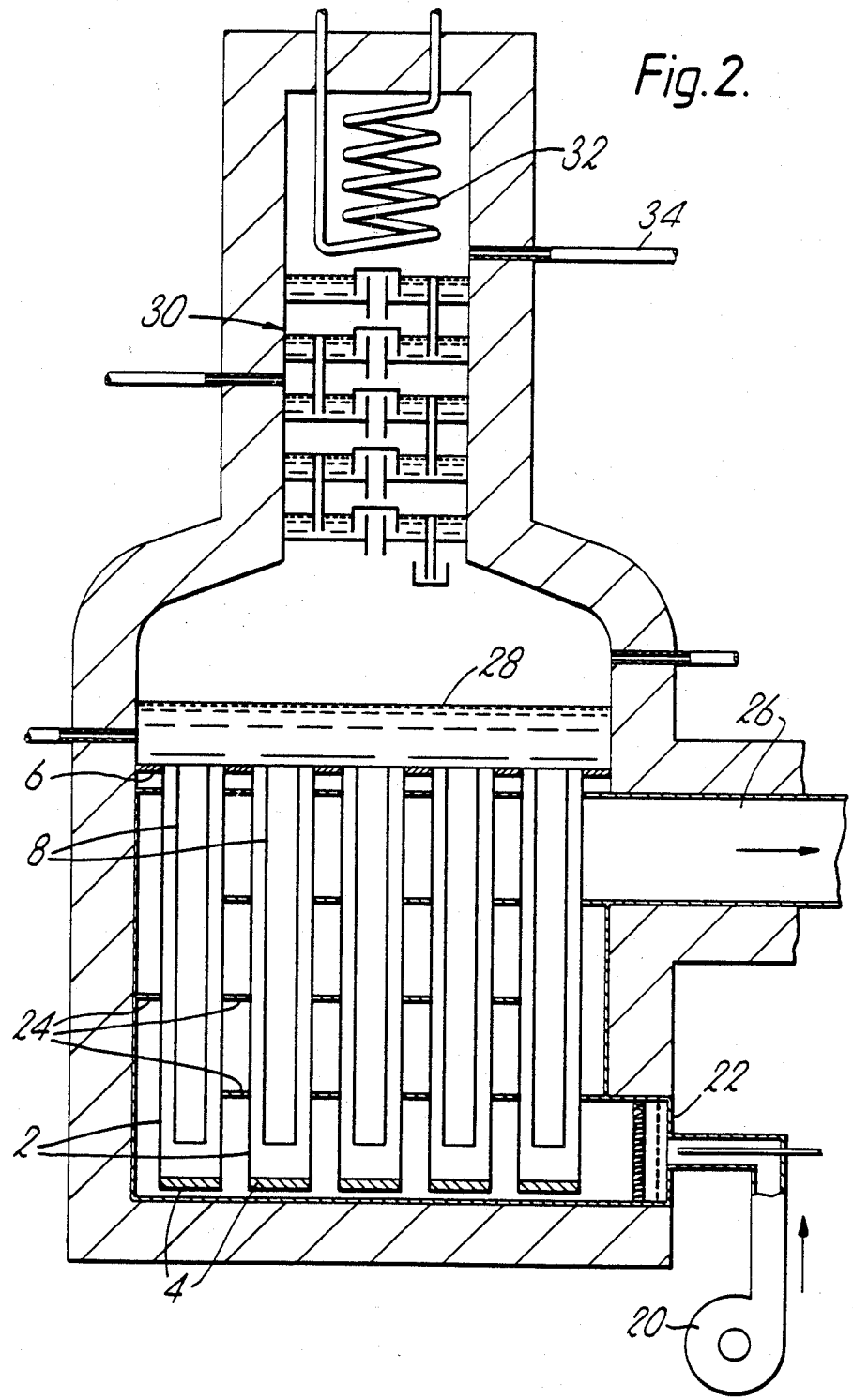

The invention will now be described with reference to the accompanying drawings in which, FIG. 1 represents a section through an evaporator tube suitable for use in the invention, FIG. 2 represents a section through a reboiler in accordance with the invention.

Figure 3:
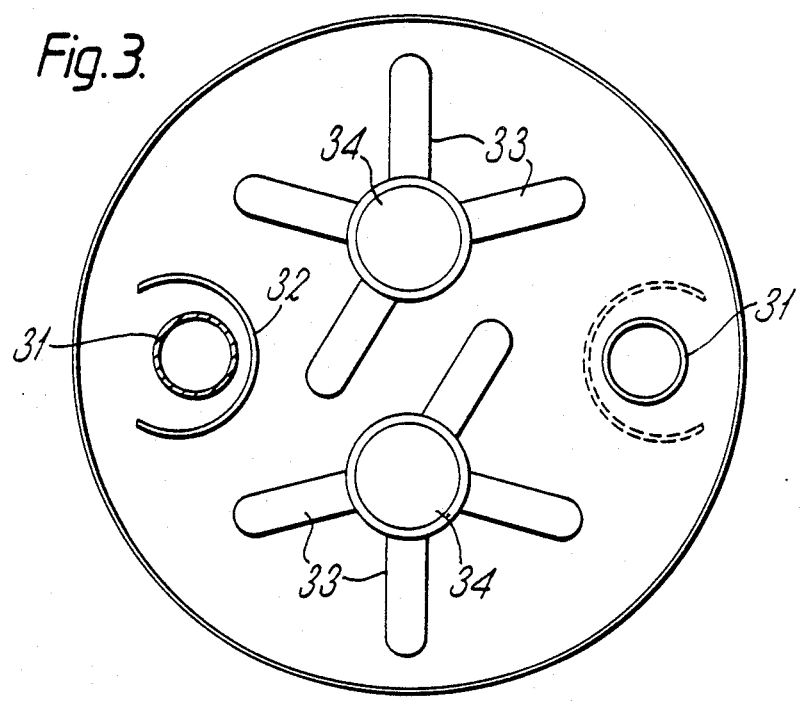
Figure 4:
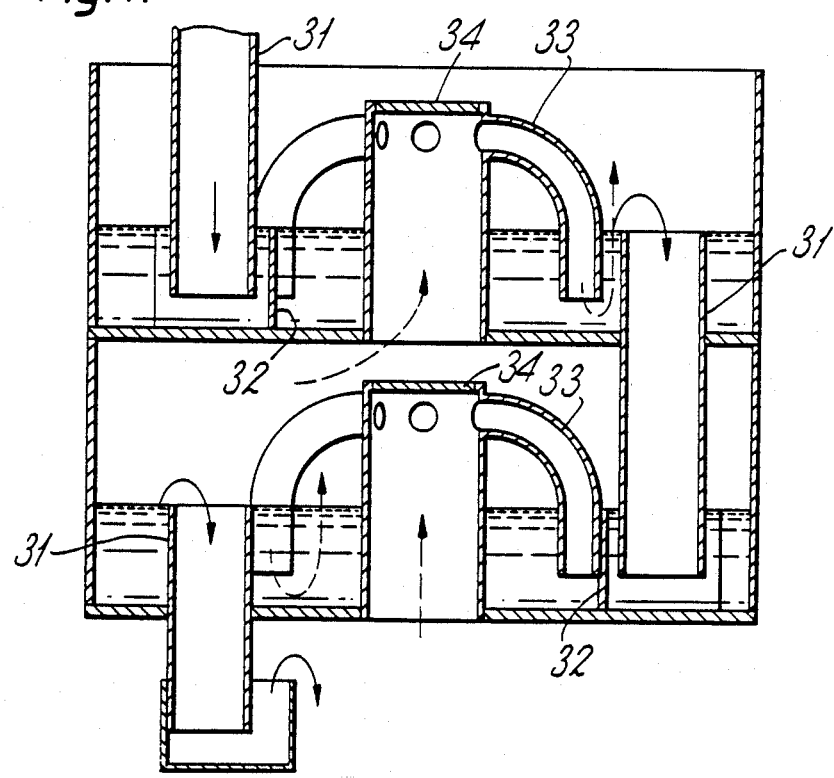

FIG. 3 represents a plan view of a rectifier column for use in the invention and FIG. 4 represents a vertical section through the rectifier column of FIG. 3.

Referring to FIG. 1, an evaporator section suitable for use in a reboiler of the invention comprises an upright tube 2 of sufficient thickness to withstand the highest required coincidental pressure and temperature conditions of the generator. The tube 2 is sealed at the lower end by an end cap 4 and is connected at its upper end to a tube plate 6 forming part of a header which will hold saturated liquid e g. ammonia and water mix, and evolved vapor. An inner tube 8 is concentrically mounted within the evaporator tube 2 and is held in place by rods, springs or clips (not shown). The inner tube 8 extends from the upper end of the evaporator tube 2 to a point above the end cap 4 thereby allowing communication at the lower end of evaporator tube 2 between the central bore of the inner tube 8 and the annulus formed between the inner tube 8 and the evaporator tube 2.

In operation, liquid is introduced into the header to provide a level of liquid in the header above tube plate 6 thereby ensuring that tubes 2 and 8 are completely filled with liquid. Heating the outer surface of tube 2 causes boiling to occur in the annulus 10 formed between tubes 2 and 8 and vapor rises through the liquid contained in the annulus towards the liquid surface in the header, creating a difference in bulk density between the liquid in the bore of tube 8 and the fluids in the annulus 10. This density difference creates a natural circulation of liquid which is drawn down the bore of tube 8 from the body of liquid contained in the header, around the gap between the bottom of tube 8 and the end cap 4 to pass through to the annulus 10 where boiling occurs.

FIG. 2 represents a reboiler in accordance with the invention incorporating evaporator tubes as illustrated in FIG. 1. The reboiler comprises a fan 20 supplying combustion air under pressure to burner 22 which may burn any suitable fuel, eg. gas, oil etc.. The primary heating gas from the burners is passed over the evaporator tubes 2 using a series of baffles 24 and exits the generator via exhaust 26. Liquid within the evaporator tubes 2 supplied from the header 28 vaporizes and circulates in the manner described with reference to FIG. 1.

The vapor generated is passed from the header 28 out of the vapor space and into moisture separators or vapor enriching rectifying trays generally shown at 30. The reboiler may include a rectifier heat exchanger 32 in the region of the purified vapor prior to the vapor exiting the generator via exit 34.

The rectifying section of a reboiler of the invention is disclosed in more detail in FIGS. 3 and 4.

In order to purify one component from a mixture of several a distillation column can be used if the components can be identified by different boiling temperatures. Trays are often used in such columns to collect intermediate concentrations of mixture and to act as receiving chambers in exhausting or stripping columns. These columns of trays operate by achieving an equilibrium in each stage between the vapor ascending the column and the liquid descending through the trays. Heat and mass transfers occur in each tray by inducing turbulent contact of liquid and vapor phases so that ascending vapors are enriched with highly volatile components from the descending liquid and less volatile gases condense in the tray liquid to further dilute the descending liquid. Consequently ascending vapor is progressively purified while descending liquid is progressively diluted.

In some processes it is necessary to purify vapors to a higher degree than that attainable from available exhausting column feed stocks. This is achieved using a rectifying column in which descending liquid is derived from some of the purified product. A portion of the purified vapor is condensed to form liquid that feeds the tray system in order to purify more vapor. Consequently some of the vapor ascending such a column is condensed only to descend the column again where it will be reboiled into vapor and the process repeated.

It is essential that liquid and vapor make direct turbulent contact in each tray to maximize heat and mass transfers thereby achieving equilibrium in each tray.

Rapid mixing is induced by imposing relatively high vapor flow rates through tubes submerged in liquid temporarily held in each tray. The contact is improved by ensuring that vapor bubbles rise through a minimum depth of liquid in each tray and providing numerous sites at which vapor bubbles are evolved.

FIGS. 3 and 4 show the features of the tray design used in conjunction with the reboiler. A tube 31 connects adjacent trays to permit the downward flow of liquid. It is positioned to provide a minimum depth of liquid in a tray, acting as a weir that channels overflow to lower trays. The outlet from tube 31 is submerged in the liquid of the tray beneath it, providing a seal against vapor flow up the tube. A small curved guard plate 32, attached to the tray prevents vapor bubbles entrained in the swirling liquid from entering tube 31. Liquid inlets and outlets for trays are positioned diametrically opposite each other in order to ensure that all liquid passes through the vapor mixing zone before it passes to the next tray.

Vapor is introduced into the trays through curved tubes 33 that are partially submerged in the liquid. A number of these tubes are joined to a capped riser 34 of much larger flow area than the sum of the flow area of the curved tubes. In the illustrated arrangement four curved tubes are attached to each of two vapor risers on each tray, although more tubes and risers could be used according to the application and flow rates. The dashed arrows represent the passage of vapor and the solid arrows represent the passage of liquid.

The use of the above rectifier column has several advantages.

(i) the column operates by fluid flow rather than mechanical action so components do not wear;

(ii) the column operates silently, (iii) guard plate 32 ensures that all vapor is channelled through the risers in each tray, (iv) positioning liquid inlets and outlets in trays opposite each other ensures the maximum liquid flow path lengths are achieved so improving liquid and vapor contact which increase tray efficiencies, (v) using a large diameter vapor riser prevents formation of a siphon if the tray overflow tube becomes overloaded with liquid, causing the liquid level in the tray to rise, (vi) the design of tray ensures that it will remain operative over a wide range of conditions and with discontinuous flow rates that can cause temporary flooding, (vii) the numbers and positions of the curved vapor tubes can be arranged to achieve uniform vapor distributions in the tray in order to improve liquid turbulence, vapor contact with the liquid and tray efficiency;

(viii) trays for exhausting and rectifier column sections can be of the same construction.

The reboilers of the invention may be used to generate vapor from Ammonia Water mixes as used in domestic central heating system heat pump applicatins.

We claim:

1. A reboiler comprising a rectifying section and an evaporating section wherein the evaporating section comprises a plurality of upright evaporator tubes connected at their upper ends to a tube sheet, means for supplying liquid to the evaporator tubes and means for heating the surface of the evaporator tubes, the lower ends of the evaporator tubes being sealed and each evaporator tube being provided with a concentrically positioned inner tube extending from the upper end of each evaporator tube to a position above the sealed end of each evaporator tube, and wherein the rectifying section comprises a series of trays containing liquid and means for directing vapor generated in the evaporating section through the trays.

2. A reboiler as claimed in claim 1 in which the means for heating comprises a burner and means to control the flow of hot combustion gas over the evaporator tubes.

3. A reboiler as claimed in claim 1 or 2 in which the tube sheet forms part of a header supplying liquid to the evaporator tubes.

4. A method of generating vapor from a liquid which comprises introducing liquid into a reboiler as claimed in claim 1; heating an outer surface of the evaporator tubes thereby causing boiling of the liquid in the annulus formed between the evaporator tube and its concentrically mounted inner tube, the vapor rising through the liquid contained in the annulus and the liquid in the inner tube circulating from the inner tube to the annulus; and passing the generated vapor through a plurality of trays containing various conncentrations of the liquid in the rectifying section.

5. A method as claimed in claim 4 in which the liquid comprises ammonia and water.

* * * * *